Jan. 10, 1956  E. CHAPMAN  2,730,007
APPARATUS FOR PRODUCING STRESS IMAGES
Filed April 12, 1952  6 Sheets-Sheet 1

Inventor
EVERETT CHAPMAN
By
Synnestvedt & Lechner
Attorneys

Jan. 10, 1956  E. CHAPMAN  2,730,007
APPARATUS FOR PRODUCING STRESS IMAGES
Filed April 12, 1952  6 Sheets-Sheet 2

Inventor
EVERETT CHAPMAN
By
Synnestvedt + Lechner
Attorneys

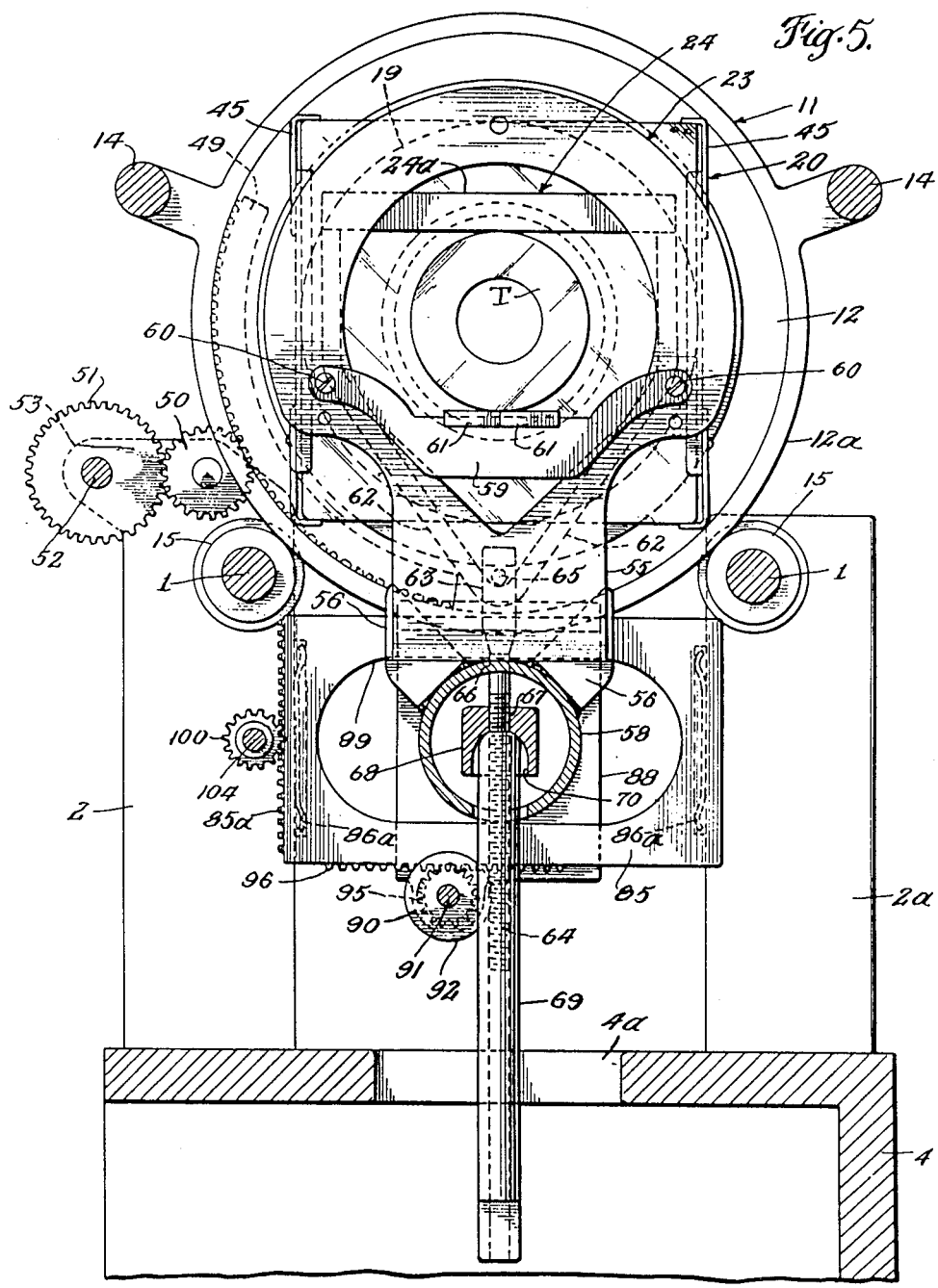

Inventor
EVERETT CHAPMAN
By
Synnestvedt + Lechner
Attorneys

United States Patent Office 2,730,007
Patented Jan. 10, 1956

2,730,007

APPARATUS FOR PRODUCING STRESS IMAGES

Everett Chapman, West Chester, Pa.

Application April 12, 1952, Serial No. 282,014

15 Claims. (Cl. 88—14)

This invention relates to apparatus for the analysis of stress distribution in machine parts, structural members, or the like and in particular, the invention is concerned with apparatus for producing an observable stress image or pattern from a test specimen or model of a part, the model being constructed of material which is birefringent under stress.

The invention contemplates an arrangement of components for producing a stress image, which components are disposed along an optical axis, providing a novel operating system controllable from a central station. The invention further provides a station for viewing the image located adjacent the central control station, which arrangement permits an operator to manipulate controls to effect a change in stress pattern while simultaneously viewing the pattern.

The fundamental principle involved in the operation of the apparatus of the kind in question is that when a load is applied to a piece of isotropic material, such as glass, celluloid or the like, it becomes birefringent, that is to say, becomes double refracting in the stressed areas, i. e., the light passing through the stressed areas is caused to vibrate in two mutually perpendicular planes. The behavior of this property generally depends upon the shape of the material and the amount of load being applied thereto. In producing stress patterns, the material is used in conjunction with polarized light.

Plane polarization of a light beam is ordinarily accomplished by the use of an optical element having the property of permitting propagation of light vibrations therethrough in planes parallel to one another. Two of these elements are used, one being called a polarizer and the other an analyzer.

If an unstressed piece of birefringent material is disposed between a polarizer and an analyzer with the axes of the polarizer and analyzer set exactly at right angles to one another and the assembly exposed to white light, no light will pass through, as the light from the analyzer will be blocked by the polarizer. If the material is stressed, however, the incident ray from the polarizer is caused to vibrate in mutually perpendicular directions, and the vibrating component, which is co-planar with the analyzer, will pass therethrough. This results in an image having a plurality of lines or fringes which indicate the locus of all stresses parallel to the plane of polarization, thus giving the direction of inclination of stress.

The plane of polarization may be changed by angularly orientating the polarizer and analyzer the same amount relative to the material.

For investigating stress intensity, circularly polarized light is used, and this is accomplished by placing quarter wave plates on opposite sides of the specimen between the analyzer and polarizer. These plates tend to rotate the light beam, and when the assembly is subjected to white light and the material stressed, the analyzer passes the light with one frequency cancelled out, resulting in a brilliantly colored image. Unequally stressed portions give rise to different hues. In the above arrangement, monochromatic light may be used to obtain light and dark fringes, enabling more accurate investigation of areas having heavy stress concentrations.

Thus, where it is desired to investigate the stresses set up in a loaded machine part or the like, a test specimen or model corresponding in plane section to the profile of the part is constructed. The model, having the same profile as the part and being loaded in a manner similar to that encountered by the part under operating conditions, develops stresses corresponding exactly to operating stresses with both the inclination and amount being determinable.

Heretofore, various forms of apparatus for producing a stress image have been employed. Generally, such apparatus comprises a source of light, a polarizer and analyzer, and a viewing screen, together with appropriate lenses, these components being arranged along a horizontal optical axis. Ordinarily, such equipment includes quarter wave plates for circularly polarizing light and means for stressing a test model positioned on the optical axis.

All of the equipment heretofore employed is subject to certain inherent disadvantages. For example, in such equipment the image viewing screen ordinarily takes the form of a ground glass plate which is arranged in a vertical position at right angles to the optical axis. For observing the image, the direction of view is opposite to the direction of propagation of the light. Such an arrangement is open to two serious defects. In such an arrangement rather poor image definition is obtained because the image must be transmitted through granular material. In those instances where the image is to be traced on paper, the vertically arranged screen does not lend itself to convenient and accurate tracing operations. Furthermore, when tracing paper is placed over the viewing screen, the definition of the image is further obscured.

Another serious disadvantage of prior equipment is that the various controls are not centralized so as to be at the command of the operator as he views the image. For example, accurate analysis requires that the polarizer and analyzer be maintained in a predetermined angular relationship as they are rotated to change the plane of polarization. In known equipment the polarizer and analyzer are independently rotatable, each having indicia to indicate the respective angular positions. Since these units are located at some distance from the viewing screen, changing the plane of polarization while maintaining the correct angular relationship between the elements is often difficult. Furthermore, since it is necessary for the operator to observe the indicia indicating the amount of angular rotation, he cannot simultaneously rotate the plane and observe the image.

Another disadvantage with present equipment is that the application of stress to the test specimen by means of the loading mechanism is not centrally controllable so that the change in the image may be viewed while the specimen is being stressed.

A further disadvantage in the equipment is that no means are provided whereby the plane of polarization may be observed on the viewing screen as the plane is changed.

In addition, present equipment does not provide scanning means controllable by the operator while he is simultaneously viewing the image.

According to the invention, certain of the components are mounted along an optical axis on two spaced-apart horizontally disposed supporting bars. At one end of the bars is located a bracket having a source of white light and a source of monochromatic light, which are slidable transversely of the bars for alternatively positioning either light for projection through the components along the optical axis to an image viewing station.

Located adjacent the light source is a condenser lens secured within a housing, which is attached to one end of a barrel-like structure, which supports an analyzer and a polarizer and has mounting means for quarter wave plates. The barrel-like structure is comprised of two members generally in the shape of a truncated cone, which are secured together in spaced-apart relationship. The polarizer and a quarter wave plate are secured to one of these members, and the analyzer and a quarter wave plate are secured to the other. The analyzer is provided with means to form an image indicating the plane of polarization, which image is projected to the viewing station. The structure is rotatable on the supporting bars, the rotation being controllable from a central control station.

Between the two cone-like members of the barrel structure is located the mounting mechanism for the test specimen. The mounting mechanism is provided with certain means whereby the test specimen may be loaded in tension, compression or flexure. The control for the loading mechanism is located at the central control station. The test specimen may also be stressed independently from the foregoing by application of known weights to a loading shackle.

The mounting means for the specimen is movable both horizontally and vertically so that the specimen may be scanned universally, i. e., variably positioned transversely of the optical field. The vertical and horizontal movement of the mounting mechanism is operated by certain control knobs located at the central control station. The arrangement is such that the test specimen may be stressed regardless of its position in the optical field, and the stressing and scanning may be accomplished regardless of the rotational position of the barrel.

Disposed along the optical axis adjacent the barrel is mounted a field lens, the purpose of which is to magnify the images. The position of the collimator along the optical axis is controllable by a control knob located at the central control station.

At the opposite end of the mounting bars is located an image lens and a right angle prism. The position of the lens and prism is controllable along the optical axis by means of a knob located at the central control station. The lens serves to focus the images at the viewing station.

The purpose of the right angle prism is to project the images transversely to the principal optical axis to the viewing station whereby the images may be observed along the direction of propagation of light. In the preferred form, the image is projected downwardly at right angles to the axis of the viewing station, although the arrangement provides projection in any radial direction.

The invention is especially useful in engineering departments and laboratories where stress analysis investigation is being carried out, because with the apparatus, the distribution and intensity of stresses can be determined in any loaded member which can be represented by a plate model. For example, the apparatus is applicable for investigation of stresses in structural parts and also in various machine parts, such as gears, cams, etc. The apparatus of the present invention is particularly adaptable in these instances because it is exceedingly simple to operate and does not require a knowledge of optics on the part of the operator.

The novelty and utility of the present invention will be further apparent from the following description and drawings wherein:

Figure 5 is a cross section taken substantially on the line 5—5 of Figure 3;

Figure 6 is a cross section taken on the line 6—6 of Figure 1;

Figure 7 is a cross section taken on the line 7—7 of Figure 1 but showing a specimen of larger size carried by the mounting mechanism and showing the mechanism adjusted to a different scanning position;

Figure 8 is an enlarged fragmentary longitudinal section taken on the line 8—8 of Figure 1;

Figure 1:
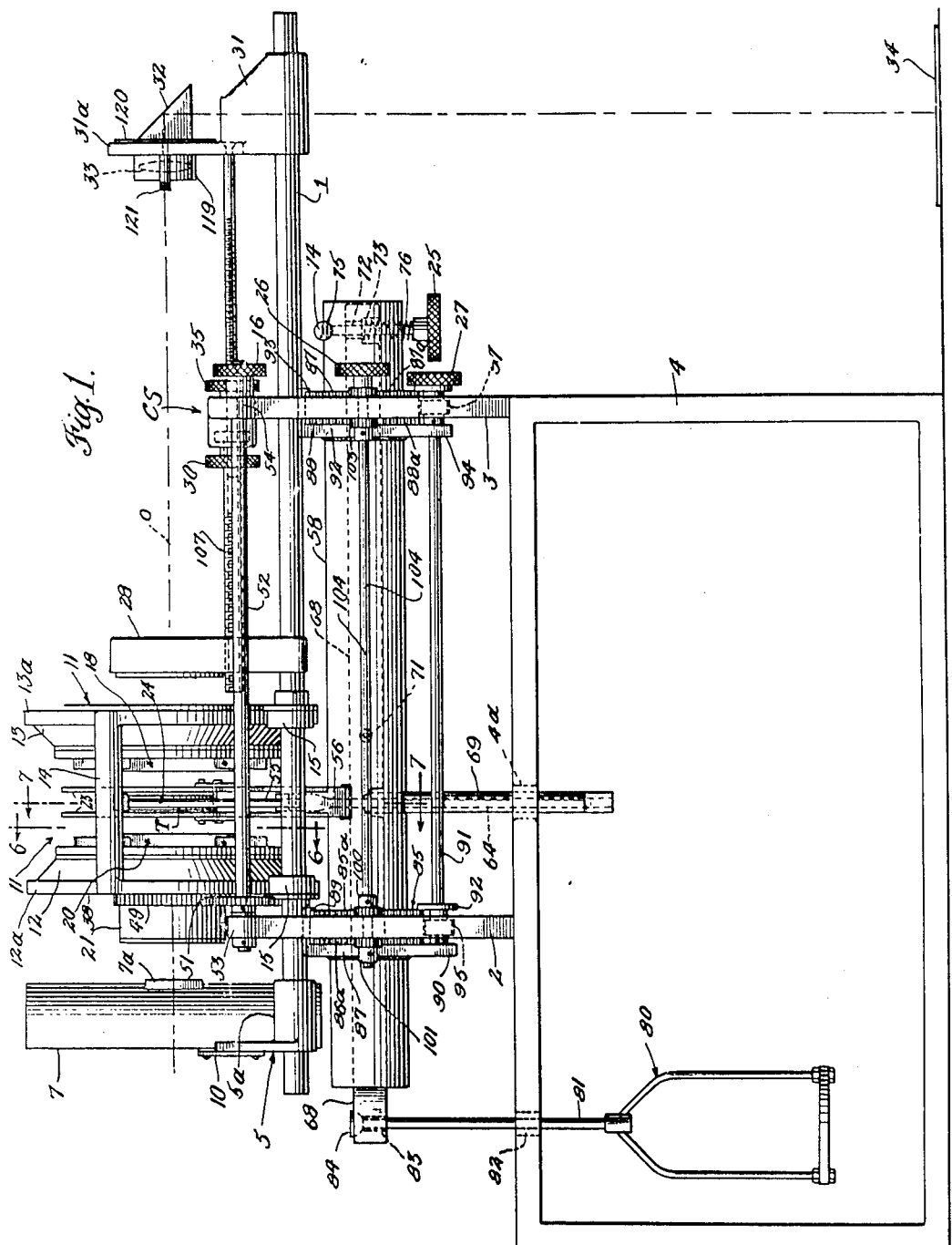
Figure 1 is a side elevational view of apparatus embodying the invention.
Figure 2:
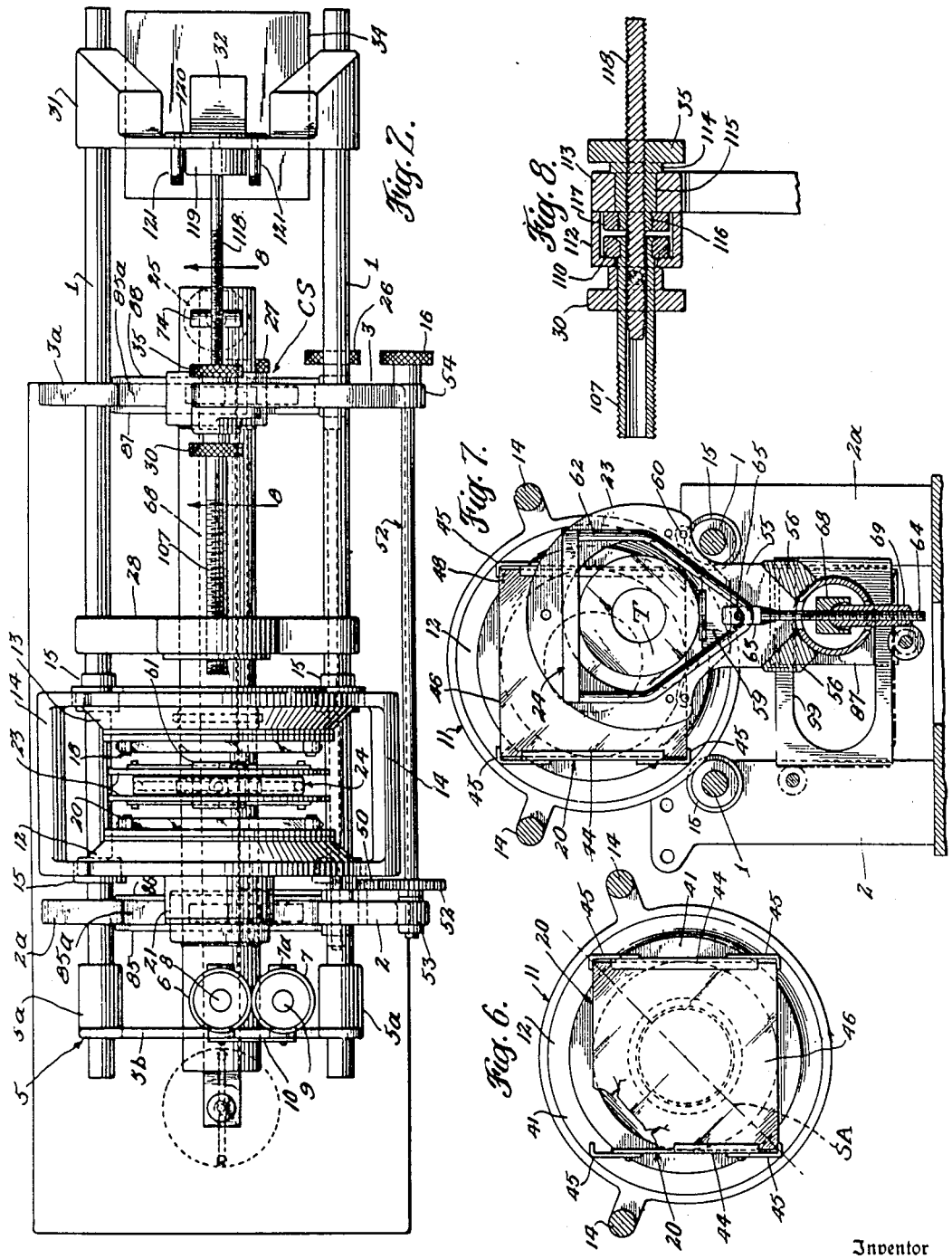
Figure 2 is a plan view of Figure 1.

The general arrangement of the equipment of the present invention is shown in Figures 1 and 2. Supporting bars 1—1 are secured in upright posts 2 and 3 mounted on the box-like structure 4. A light bracket generally indicataed by the reference numeral 5 is disposed at one end of the supporting bars. The tubular legs 5a—5a of the bracket envelop the bars to provide for slidable movement of the bracket and are connected together by cross member 5b. The lamp housing, containing lamps 8 and 9, is slidably secured to cross member 5b as by bracket 10. By means of this arrangement either lamp within the housing may be positioned along the optical axis, generally indicated by the letter O.

The lamp 8 is the ordinary incandescent type and provides a source of white light. The lamp 9, together with the filter 7a, provides a source of monochromatic light. The lamp is an ordinary mercury vapor type, and the filter is a glass type, which separates out the 5460A line in the mercury spectrum.

Disposed adjacent the light source is a barrel-like structure generally indicated by the reference numeral 11. The barrel-like structure generally comprises two elements, 12 and 13, each of which is somewhat in the form of a truncated cone and are secured together by cross bars 14—14. The respective bases 12a and 13a of the elements 12 and 13 abut rollers 15—15, which are rotatably mounted on bars 1—1. The rotation of the barrel is accomplished by actuation of knob 16 through a drive system which will be described more in detail hereinafter.

The element 13 houses an analyzer 17 (Figure 3) and a quarter wave plate mounting structure 18. The element 12 houses the polarizer 19 and a quarter wave plate mounting structure 20. Also secured to the element 12 is housing 21, which serves as a mounting means for the collimator lens 22. The purpose of the lens 22 is to receive light from the source being used and to project this light in a parallel beam along the optical axis generally indicataed by the reference letter O.

The polarizer and analyzer are fixedly secured in the respective elements 12 and 13 with the polarizing axes being set at right angles to one another. The purpose of these units is to plane polarize the light beam. The elements indicated by the numerals 17a are certain indicia for forming an image which is projected to a viewing station 34 to indicate the plane of polarization.

Disposed between the elements 12 and 13 are certain structural elements generally indicated by the reference numerals 23 and 24. These elements serve as a mount for a specimen such as one indicated by the letter T (Figure 5) and in conjunction with other components to be later described provide means for stressing the specimen and moving the same relative to the optical axis. Stress may be applied to the specimen by actuation of control knob 25, which operates certain elements to apply the desired stress to the specimen. The specimen may be scanned or moved relative to the optical axis by actuation of control knobs 26 and 27, which respectively move the specimen in vertical and horizontal directions.

Figure 3:
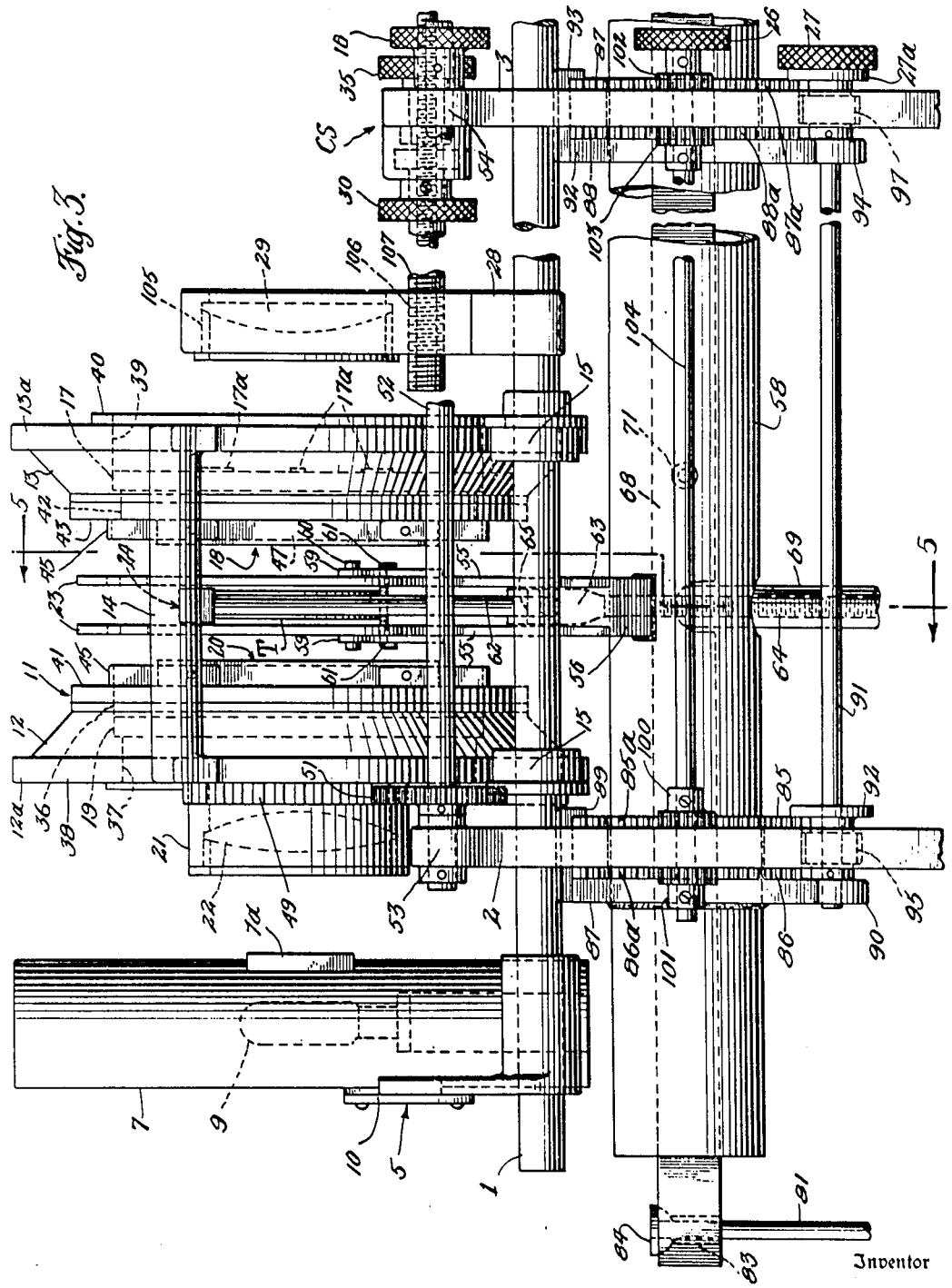
Figure 3 is an enlarged fragmentary side elevational view.

Located adjacent the element 13 is bracket 28, which houses field lens 29 (Figure 3). The purpose of the field lens is to receive the stress image of the specimen and the image from the indicia which are propagated from the analyzer 17 and to magnify the same. For this purpose the bracket may be moved along the optical axis by actuation of control knob 30.

At the right-hand end of the bars 1—1 is located bracket 31, which serves as a mount for prism 32 and lens 33. The prism 32 projects the images transversely to the optical axis to the image receiving station 34. The image lens 33 serves to focus the image, and for this purpose, bracket 31 is adjustable along the bars by actuation of control knob 35.

It is to be observed that the above referred to control knobs are located at a central control station CS, with the viewing station 34 adapted thereto. The viewing station may be located somewhat upwardly from the position shown in Figure 1 so as to be closer to the control station. The usual position of the operator's eyes is on the right-hand side of the equipment (as viewed in Figure 1) between the bars 1—1 and the viewing station 34.

The details of construction and operation of certain of the components of the present apparatus will now be described.

The arrangement of the barrel-like structure 11, including the lens, analyzer, polarizer, and quarter wave plates associated therewith, and how this assembly is adapted to be rotated is best seen in Figures 3 and 5. As has been mentioned above, the elements 12 and 13 of the barrel are rigidly connected together by cross bars 14—14, which are disposed somewhat near the top of the barrel so that the barrel may be angularly oriented in the desired manner without interference between the cross bars 14—14 and the supporting bars 1—1. The means for rotating the barrel will be described shortly.

The element 12 has a circular recess 36 extending inwardly from face 41. The polarizer 19 is fixedly secured on a ledge at the innermost part of the recess. The polarizer 19 is constructed of a commercially-available material called Polaroid, and its purpose is to plane polarize the light beam, that is to say, permit passage of light vibrations only in parallel planes. The axis of the polarizer, which corresponds to the plane of polarization, is aligned in a known manner with respect to the element 12.

The element 12 also has circular recess 37 which expends outwardly to the face 38 of element 12. The tubular-like housing 21 fits over the recess and is secured to the outer face 38. The condenser lens 22 is mounted within the housing 21 in a known manner. It is to be observed that the recesses 36 and 37 form an opening in the element 12 through which light from the condenser lens 22 may pass.

The element 13 is constructed in a similar manner as the element 12, having a circular recess 39 extending inwardly from outer face 40 with the analyzer 17 secured at the innermost portion of the recess. The analyzer 17 is identical in construction with the polarizer 19. However, the analyzer is aligned with respect to the element 13 so that the axis of polarization is exactly at right angles to the axis of analyzer 17. The element 13 also has a circular recess 42, which extends outwardly to the face 43. The recesses 39 and 42 form an opening in the element 13 through which light may pass.

Figure 4:
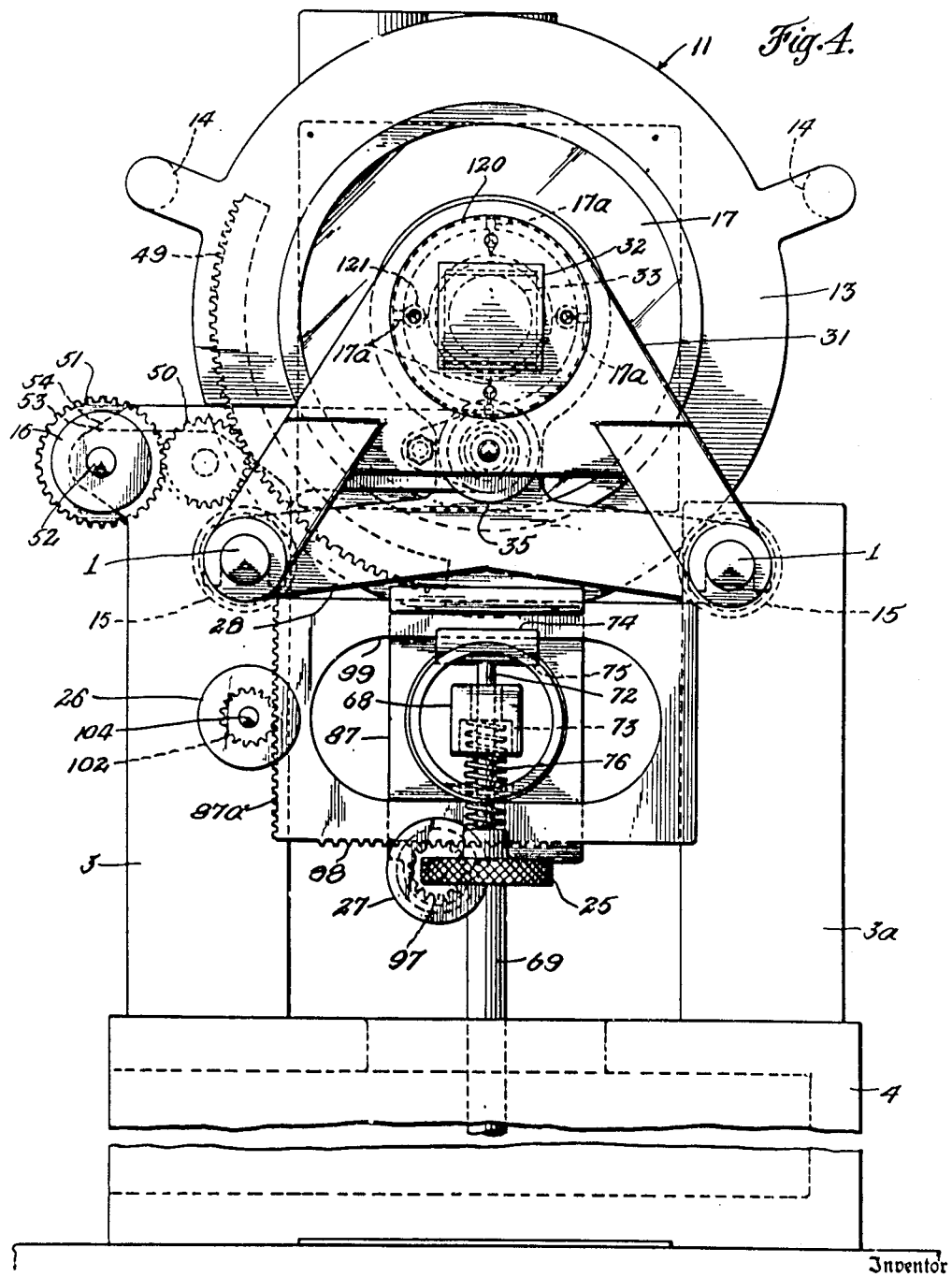
Figure 4 is an end view looking towards the left as viewed in Figure 1.

One important feature in the present invention is the means for indicating the plane of polarization. This is accomplished by securing to the analyzer small indicia 17a usually in the shape of arrows, to one side of the analyzer. These indicia 17a are shown in Figures 3 and 4. The tips of the arrows point toward one another and are arranged so that a line connecting one set of tips is parallel to the axis of polarization of the analyzer. The other set of lines are set 90° away. The reason for the latter set is so that if the first set "blacks out" during some position of polarization the second set may still be used. The arrows lie within the optical field so that an image of the tips is projected along the optical axis to the prism 32 from where it is projected on to the viewing station 34. It will be apparent that as the barrel-like structure 11 is rotated to change the plane of polarization, the arrows are also rotated therewith and, therefore, automatically indicate at the viewing station the orientation of the plane.

The quarter wave plate assembly 20 is secured to the face 41 of the element 12. As best seen in Figure 6, the assembly is comprised of U-shaped brackets 44—44, each having a flat surface of one of the legs of the U attached to the face 41. The attachment is made adjacent the ends of the U-shaped bracket. Each of the U-shaped brackets carries on its extremities L-shaped yieldable brackets 45, the feet of the L-shaped brackets serving to hold the quarter wave plate 46 in the assembly. The quarter wave plate 46 is easily inserted or removed from the assembly by spreading the topmost L-shaped brackets. The manner of mounting the quarter wave plate 47 and the quarter wave plate asembly 18 is identical with that described above.

It is to be observed that the shape of the quarter wave plates 46 and 47 is square. In shaping the plates in this form, the slow axis is made to connect two opposite corners of the square. For example, the slow axis of the plate j is along the line indicated by the letters SA in Figure 6.

The construction of the wave plates and the manner of mounting as described above is an important feature of the present invention. In the study of isocromatics, it is often desirable to observe the image with dark and light fields. This is accomplished by orientating the slow axes of the two plates relative to one another in a known manner. When the slow axes of the two plates lie in the same or in parallel planes, the field is light, and when one of the axes is rotated at 90° to the other, the field is dark.

By making the quarter wave plates square and having the slow axes on a diagonal, the change in field may be accomplished at a very simple, convenient and fool-proof manner. In the preferred arrangement, I put a red dot and a green dot in a corner containing the slow axis of the wave plate, for example, the dots indicated by 48 in Figure 7. In the other quarter wave plate I put a red dot and a green dot in adjacent corners, the green dot being in a corner containing the slow axis. When the plates are adjusted in their mounts so that the red dots are in juxtaposition, the field is dark; when the two green dots are in juxtaposition, the field is bright.

The manner in which the barrel 11 is rotated will be described following. As best seen in Figure 5, a somewhat semi-circular rack or gear segment 49, is mounted on the face 38 of element 12, which engages a pinion 50 rotatably mounted on upright post 2, for engaging a drive gear 51 fixedly secured to control shaft 52. One end of the shaft 52 is supported in suitable bearing 53 in the top of upright post 2 (Figure 3). The other end of the shaft is supported in bearing 54 in the top part of upright post 3. The control knob 16 is fixedly secured to the end of the shaft. As has been previously mentioned, the base portions 12a and 13a of the elements 12 and 13 are engaged with rollers 15—15 rotatably mounted on support bars 1—1. Thus, when the knob 16 is actuated, the barrel assembly may be rotated in a clockwise or counter-clockwise direction.

As will be apparent, the barrel assembly rotates as a unit and, therefore, the fixed relationship between the analyzer and polarizer is continuously maintained regardless of the rotation of the barrel. This arrangement permits the plane of polarization to be easily and conveniently changed for there is no necessity for independently rotating the analyzer or polarizer. In addition, it is to be observed that this change in the plane of polarization is accomplished by merely the turning of one control located at a central control station and permits the operator to observe the behavior of the image as the plane of polarization is changed and also to observe the orientation of the plane.

The manner in which the test specimen is mounted and the means for loading or stressing the specimen will now be described.

A test specimen T as seen in Figure 5 is mounted between brackets 23—23 and 24. The brackets 23—23 serve generally as a fixed base or support for the specimen while the bracket 24, being connected to certain operating mechanism, serves to stress or load the specimen. The arrangement shown is for developing stresses in compression.

The brackets 23—23 are ring-like in shape and have downwardly extending portions 55—55, which are secured to radially extending brackets 56—56, which are welded to tube 58. The tube 58 is horizontally supported in a manner which permits the tube to be oriented with respect to the optical axis but to be fixedly held in any given position of orientation. The manner in which this is accomplished will be fully described in connection with the description of the scanning mechanism.

Each of the brackets 23—23 is provided with a horizontal support 59, which is secured to the circular portion of the bracket as by screws 60—60. On the flat portion of the horizontal support are located load bars or platforms 61—61, which are freely removable and also adjustable along the horizontal portion. As will be apparent, the specimen T is mounted on these bars.

The stressing bracket 24 comprises a cross member 24a and downwardly extending V-shaped legs 62—62. The top of the specimen abuts the cross member 24a. The yoke 63, having a downwardly extending threaded stud 64, is suspended at the V of member 24 as by pivot 65. The stud 64 extends downwardly from the yoke 63 through a recess 66 in tube 58 and through a recess 67 in bar 68. As best seen in Figure 3, the bar 68 is disposed along the axis of tube 58. A sleeve 69, having a rounded head portion, is threaded over the stud 64 and extends downwardly through a recess 4a in box 4. The rounded head portion of the sleeve engages the bar within the recess 70.

As best seen in Figure 3, the bar 68 is pivoted within tube 58 as by pivot 71. The bar is adapted to be moved about the pivot by actuation of control knob 25. The control knob 25 is threaded to a shaft 72 (Figure 4), which extends upwardly through the shouldered recess 73 in bar 68 and is fixedly attached to cross bar 74, which is seated in recess 75 in tube 58. A spring 76 is disposed between the control knob 25 and the shouldered portion of the recess 73 in bar 68.

When the control knob 25 is moved clockwise, it moves upwardly on the shaft 72 and compresses spring 76. The compression of the spring tends to move the right side bar upwardly about the pivot 71 (as viewed in Figure 3). The portion of the bar on the left-hand side of the pivot thus tends to move downwardly and engages the rounded head portion of sleeve 69. Since the sleeve 69 (Figure 5) is threaded to the downwardly extending stud 64 of yoke 63, the yoke, hence the stressing bracket 24, is pulled downwardly. Since the supporting brackets 23—23 are in a fixed position, a compressive force is applied to the specimen T. When the knob 25 is moved in a counterclockwise direction, the tension in the spring 76 is released and the stress applied to the specimen is lessened.

Figure 9:
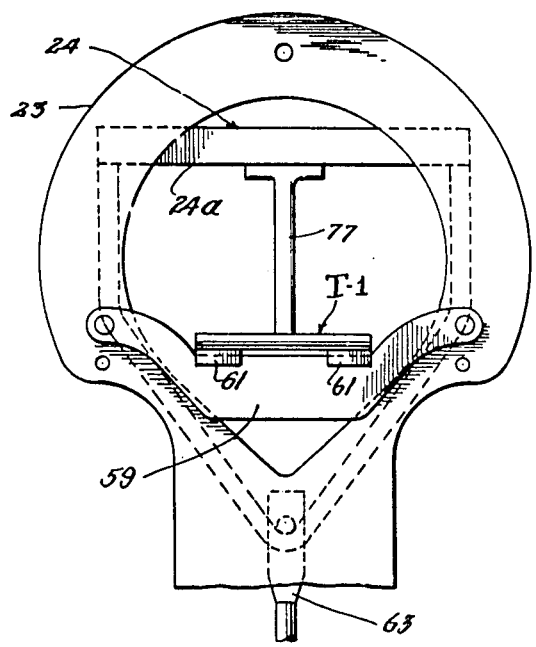
Figure 9 shows a specimen in place for loading in flexure.
Figure 10:
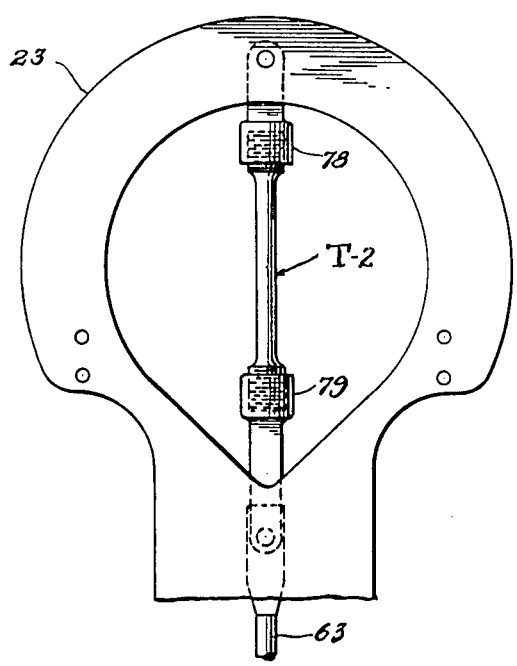
Figure 10 shows a specimen in place for loading in tension.

The above-described arrangement is adaptable for applying stresses in tension or in flexure as will be readily apparent from an inspection for Figures 9 and 10. Figure 9 shows an arrangement for applying stress in flexure. The test specimen T-1 is supported on the load bars 61—61. A T-shaped adapter 77 is disposed between the specimen and the cross member 24a. When the stressing bracket 24 is pulled downwardly, a load is applied to the center of the test specimen and the specimen therefore flexes. Figure 10 shows a method for testing a specimen under tension. An adapter 78 is secured to the support brackets 23—23 while an adapter 79 is secured to the yoke 63. A test specimen T-2 is disposed between these two adapters. When the adapter 79 is pulled downwardly, the test specimen is put under tension.

The above-described arrangement for mounting and loading a test specimen under tension, compression or flexure is an important feature of the present invention. It is to be observed that any of the desired loadings may be accomplished by actuation of a single control knob which is located at a central control station. This arrangement permits an operator to apply continuously varying loads to a test specimen while observing the behavior of the image as the specimen is stressed.

In addition to the loading features above-described, the apparatus of the present invention has an additional stressing feature in the event it is desired to know the value of a fringe appearing in the image per pound of load. A dead weight loading shackle has been provided for this purpose. As seen in Figure 1, the shackle 80 is disposed within the box-like structure 4 and has an arm 81 extending upwardly through the recess 82 in box 4 and through a recess 83 in bar 68. A ball joint connection to the bar 68 is provided at 84. In using the shackle, the tension on spring 76 is released and then a known weight is placed on the shackle. The weight pulls the bar and stressing bracket 24 downwardly in a manner heretofore described. Varying known weights may be placed on the shackle and the value of the fringes appearing in the image are then calibrated in terms of pounds.

The scanning mechanism, that is to say, the mechanism for moving the specimen universally within a plane transverse the optical field, will now be described.

It will be recalled that the specimen is mounted between the supporting brackets 23—23 and the stressing bracket 24, the brackets 23—23 being secured to the tube 58. When the specimen is under stress, the bracket 24 is held in a fixed relationship with respect to brackets 23—23. Thus, it will be apparent that if the tube is moved in a horizontal or vertical direction (as seen in Figure 5), the brackets and the specimen will move with it. How the tube is moved to accomplish the scanning operation is set out following.

As seen in Figures 3 and 5, plates 85 and 86 are disposed somewhat between the upright supports 2 and 2a in slidable engagement therewith. The plates are fixedly secured together by means of a connecting member 85a. The plates are kept in tensional engagement with the posts by means of spring clips 86a. The plates and connecting member are provided with slots 99—99, which support the tube 58 and accommodate horibontal movement thereof. Plates 87 and 88 are disposed somewhat between the upright supports 3 and 3a in a manner similar to that described above and also have slots supporting the tube 58. An L-shaped bracket 87 is welded to tube 58 with the foot of the bracket extending inwardly and over the plates 85 and 86. A lip 89 at the end of the foot extends downwardly over plate 85. The engagement pressure between the L-shaped bracket 87 and the plates 85 and 86 is such that the bracket may be moved relative to the plates. At the lower end of bracket 87 is a downwardly extending lip 90, forming a bearing for the shaft 91. Secured to the shaft 91 is a collar 92a, which abuts the plate 85 in a manner to permit relative movement between the plate and the collar.

The L-shaped bracket 92 is welded to the tube 58. The foot of the bracket has a downwardly extending lip 93 and the bracket engages the plates 87 and 88 in a manner similar to that described in connection with plates 85 and 86. At the lower end of the bracket 92 is located a downwardly extending lip 94, forming a bearing for the shaft 91.

A gear 95 is fixedly secured to the shaft 91 and interengages with a rack 96 fixed between plates 85 and 86. Another gear 97 is fixedly secured to the shaft 91 and interengages a rack 98 fixed between the plates 87 and 88. The control knob 27 is attached to one end of the shaft 91 and an inner ledge 27a abuts the plate 87 in a manner to permit relative movement between the plate and the knob.

When the knob 27 is actuated, the gears 95 and 97 move along the respective racks 96 and 98. The gears, being secured to the L-shaped plates 87 and 92, move the plates and the tube 58 in a horizontal direction. The brackets 23—23 and 24 supporting the test specimen T, also move in a horizontal direction.

The plates 85, 86, 87 and 88 are provided with racks 85a, 86a, 87a and 88a, which respectively engage gears 100, 101, 102 and 103, all fixedly mounted on the shaft 104, which is supported in the upright posts 2 and 3. The control knob is fixedly secured to the shaft 104. When the control knob 26 is actuated, the plates move upwardly or downwardly with respect to the upright post, carrying with them the tube 58 and the brackets 23—23 and 24 holding the specimen T.

The relationship between various components of the apparatus when the specimen has been moved as above-described will be readily appreciated by an inspection of Figure 7 wherein the specimen has been moved downwardly and to the right.

The above-described arrangement wherein the specimen is adapted to be moved universally throughout the optical field, is an important part of the invention. Not only may the position of the specimen be changed, but it may be readily apparent that the specimen may be stressed in any selected position. This feature is particularly important, especially in those instances where a particular portion of a test specimen is desired to be investigated and in those instances where the size of the specimen is larger than the optical field. Investigation of large specimens may be carried out with the apparatus of the present invention by simply moving the specimen over the optical field until the stress patterns in all parts have been observed. This is particularly useful, because otherwise very large and expensive lenses would necessarily have to be used to observe the stress behavior of large specimens. In addition, it is to be noted that the control knobs for scanning the specimen are located at a central control station, thus adding to the practical workability of the equipment.

As mentioned heretofore, there are certain times when magnification of the image is desired. For example, in investigating a certain portion of a test specimen, it may be desired to amplify the image. For this purpose, I have provided field lens 29 (Figure 3), which is fixedly secured within recess 105 in bracket 28. The bracket 28 is supported on the rods 1—1 and is adapted to be moved back and forth thereon by means of the mechanism described following. The bracket 28 has a threaded hole 106, which interengages with the threads on the sleeve 107. The control knob 30 is fixedly secured to the sleeve 107 (Figure 8). A positioning collar 110 is provided at the end of the sleeve. The flat side of the collar abuts the inner portion of housing 112, which is secured to bracket 113. When the control knob 30 is turned, the sleeve 107 rotates within the threaded hole 106 in bracket 28 and tends to move the bracket back and forth along the supporting bars 1—1.

The bracket 31 carrying the prism 32 and the image lens 33 is also adjustable along the bars 1—1 by means of control knob 35. This adjustment permits the operator to focus the image appearing on viewing station 34. The control knob 35 is provided with a shoulder 114, which abuts bracket 113, and a bearing 115 for rotatably mounting it in the bracket 113. The knob is threaded at 116 to receive the positioning nut 117. The nut 117 and the shoulder 114 securely hold the assembly on the bracket 113. The other end of the lead screw is fixed in the bracket 31. When the control knob 35 is actuated, the bracket moves back or forth.

It is to be observed that the control knob 35 is located at the central control station and enables the operator to focus the image without changing his usual viewing position.

As seen in Figures 1 and 2, the bracket 31 is provided with an upwardly extending portion 31a, on one side of which is secured tubular housing 119, supporting image lens 33. The other side of the portion 31a carries the prism 32. The prism, as shown in the figures, is adapted to project the image downwardly to the viewing station 34. The prism 32, however, is rotatably mounted in adapter 120, and the prism may be angularly orientated so as to project the image in any radial direction. This is accomplished by backing out screws 121 and rotating the prism relative to the adapter. The prism may be turned, for example, 90° to its position shown in Figure 1 so that the image is projected outwardly or sidewise onto a vertically arranged projection screen. This feature is particularly useful, for example, in classroom work where instruction in image patterns is desired to be given to a large group.

The general operation of the equipment will be described following. First, the test specimen is arranged in the mounting brackets in a manner for the application of stress in tension or compression or flexure. The particular light source to be used is adjusted so that the light projects along the optical axis. The operator positions himself as mentioned above. If, for example, the analysis is desired in a certain portion of the test specimen, the knobs 26 and 27 are manipulated so as to move the specimen in a desired position within the optical field. The specimen is then stressed by manipulation of the knob 25, and a stress pattern appears at the viewing station 34. The image appearing at the station may be magnified by operating the knob 30 and may be brought into focus by operation of the knob 35. The image may be progressively stressed by operation of knob 25, and the change in the stress pattern or image may be observed while the load changes. The angular position of the plane of polarization may be continuously orientated by operating the knob 16, and the change in stress pattern observed for different orientations of the plane of polarization. The orientation of the plane of polarization is indicated by the arrow-like indicia 17a appearing on opposite sides of the image.

If it is desired to make a tracing of the image, a flat sketch pad is placed on the viewing station 34 and operation is easily carried out.

I claim:

1. Apparatus for producing a stress image from a test specimen of the type which is birefringent under stress comprising: a central control station; a viewing station located adjacent said central control station; mechanism including at least one source of light to form a beam of light for projection along an optical axis to said viewing station; mechanism controllable at said central control station for positioning the test specimen with respect to the optical axis; mechanism controllable at said central control station for stressing the test specimen while positioned with respect to the optical axis; mechanism controllable at said central control station for polarizing said light beam and optically cooperating with the test specimen to form a stress image and having means to form a second image for indicating the plane of polarization; including means to change the plane of polarization; and mechanism controllable at said central control station for projecting said images to said viewing station, the viewing station being oriented with respect to the optical axis whereby the images are observed in the direction of the propagation of light.

2. In a photoelastic machine, the subcombination comprising: two spaced-apart rods for supporting the optical system of the machine; a first pair of upright posts respectively connected with said rods and a second pair of upright posts respectively connected with said rods, each pair of posts being adapted to fixedly support the rods; a tubular member disposed below said rods and movably connected with said pairs of posts; a loading bar disposed within said tubular member and having pivotal connections therewith; means to move said loading bar about said pivotal connections; test specimen supporting bracket means fixed to said tubular member and extending upwardly between said rods; test specimen stressing bracket means connected with said loading bar and extending upwardly generally adjacent said supporting bracket means; and control means to move said tubular member both in a horizontal and in a vertical direction with respect to said rods.

3. In a photoelastic machine, the subcombination comprising: two spaced-apart rods for supporting the optical system of the machine; first means disposed adjacent one end of said rods and second means disposed adjacent the other end of said rods, both of said means being adapted to support the rods; a tubular member connected with each of said means and extending generally in the same direction as said rods; a loading bar disposed within said tubular member and having pivotal connections therewith; means to move said loading bar about said pivotal connections; test specimen supporting bracket means fixed to said tubular member extending upwardly between said rods; and test specimen stressing bracket means connected with said loading bar and extending upwardly generally adjacent said supporting bracket means.

4. A construction in accordance with claim 3 and further including a dead weight loading shackle secured to said loading bar.

5. In a photoelastic machine having an optical axis, a loading and scanning mechanism comprising: a member extending generally parallel to the optical axis of the machine and adapted to be movable both in a horizontal and in a vertical direction with respect to the optical axis; a loading bar having pivotal connections with said member and extending generally in the same direction; mechanism for supporting a test specimen having connections both with said member and said loading bar; means connected with said member and adapted to move said loading bar about said pivotal connections, and means mounting said member and for moving said member in said horizontal and vertical directions.

6. In a photoelastic machine, the subcombination comprising: two spaced-apart rods; a first pair of oppositely disposed rollers respectively mounted on said rods; a second pair of oppositely disposed rollers respectively mounted on said rods; first mechanism having means for mounting a polarizer and means for mounting a quarter-wave plate and having an annular surface cooperating with said first pair of rollers whereby to be rotatable with respect to the rods; and second mechanism fixedly connected with said first mechanism and having means for mounting an analyzer and means for mounting a quarter-wave plate, the member having an annular surface cooperating with said second pair of rollers whereby to be rotatable with respect to the rods.

7. A construction in accordance with claim 6 and further including a gear sector mounted on one of said mechanisms; a control shaft extending generally parallel to said rods and having gearing interconnected with said gear segment; and a control knob connected with said control shaft and disposed adjacent one end of said rods whereby to effect rotation of said mechanisms.

8. A construction in accordance with claim 7 and further including means for mounting a collimator lens secured to said first mechanism.

9. A construction in accordance with claim 6 and further including quarter-wave plates respectively mounted on said first and second mechanisms, each wave plate being substantially square with the slow axis connecting two opposite corners and having indicia for indicating the orientation of the axis.

10. A photoelastic machine comprising: two spaced-apart rods; a source of light mounted on said rods adjacent one end thereof; first mechanism rotatably mounted on said rods and having means for mounting a polarizer and means for mounting a quarter-wave plate; second mechanism fixedly connected with said first mechanism and rotatably mounted on said rods and having means for mounting an analyzer and means for mounting a quarter-wave plate; a field lens slidably mounted on said rods; a bracket slidably mounted on said rods and mounting an image lens and a prism; a viewing station located with respect to said prism whereby the image can be observed in the direction of the propagation of light from said source; a tubular member extending generally parallel to said rods and mounted to be movable both in a horizontal and in a vertical direction with respect to said rods; a loading bar having pivotal connections with said member and extending generally parallel to said rods; means for supporting a test specimen disposed interjacent said first and second mechanisms and having connections both with said member and said loading bar; a central control station having a plurality of independently operable control knobs for respectively effecting the following operations: to rotate said first and second mechanisms, to slide said magnification lens, to slide said bracket, to move said loading bar about said pivotal connections, to move said tubular member in said horizontal direction and to move said tubular member in said vertical direction; and interconnections respectively between said control knobs and the controlled elements.

11. A photoelastic machine comprising: two spaced-apart rods; first and second upright means each for supporting said rods generally in a horizontal position and in said spaced-apart relationship; a bracket mounted between said rods and carrying a source of white light and a source of monochromatic light; first mechanism rotatably mounted on said rods and having means for mounting a polarizer and means for mounting a quarter-wave plate; second mechanism fixedly connected with said first mechanism and rotatably mounted on said rods and having means for mounting an analyzer and means for mounting a quarter-wave plate; a second bracket slidably mounted on said rods and carrying an image lens and a reflector; a viewing station oriented with respect to said reflector whereby an image may be observed generally in the direction of the propagation of light; a tubular member connected with said uprights and extending generally parallel to said rods; a loading bar disposed within said tubular member and having pivotal connections therewith; means for supporting a testing specimen disposed interjacent said first and second mechanisms and having connections both with said member and said loading bar; and means connected with said member for moving said loading bar about said pivotal connections, said means being located adjacent said viewing station whereby to be actuable by an operator while simultaneously viewing an image.

12. A construction in accordance with claim 11 and further including a dead weight loading shackle connected with said loading bar.

13. A construction in accordance with claim 11 wherein said means for supporting a test specimen comprises two spaced-apart ring-like brackets, both fixedly connected with said tubular member and having a loading platform therebetween and a third bracket located interjacent said first two brackets and connected with said loading bar.

14. A construction in accordance with claim 11 and further including quarter-wave plates respectively mounted on said first and second mechanisms, each wave plate being substantially square with the slow axis connecting two opposite corners and having indicia for indicating the orientation of the axis.

15. A construction in accordance with claim 11 and further including a polarizer mounted in said first mechanism and an analyzer mounted in said second mechanism, the analyzer being provided with means to form an image at the viewing station for indicating the plane of polarization.

References Cited in the file of this patent

UNITED STATES PATENTS

| | | |
|---|---|---|
| 1,681,991 | Littleton | Aug. 28, 1928 |
| 2,096,964 | Frocht | Oct. 26, 1937 |
| 2,427,259 | Chubb | Sept. 9, 1947 |

FOREIGN PATENTS

| | | |
|---|---|---|
| 946,695 | France | Dec. 27, 1948 |